Figure 1:
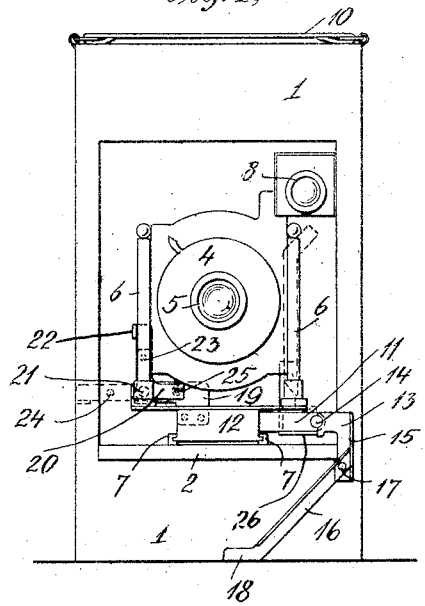

C. BORNMANN.
PHOTOGRAPHIC CAMERA.
APPLICATION FILED JAN. 12, 1912.

1,039,088. Patented Sept. 24, 1912.

Witnesses:
Max B. A. Doring
F. M. Ornsbach

Inventor
Carl Bornmann.
By his Attorney
Phillips Abbott.

UNITED STATES PATENT OFFICE.

CARL BORNMANN, OF BINGHAMTON, NEW YORK, ASSIGNOR TO ANSCO COMPANY, OF BINGHAMTON, NEW YORK.

PHOTOGRAPHIC CAMERA.

1,039,088.  Specification of Letters Patent.  Patented Sept. 24, 1912.

Application filed January 12, 1912. Serial No. 670,914.

*To all whom it may concern:*

Be it known that I, CARL BORNMANN, a citizen of the United States, and a resident of the city of Binghamton, county of Broome, and State of New York, have invented certain new and useful Improvements in Photographic Cameras, of which the following is a full, clear, and exact description.

It is the purpose of this invention to provide a support for cameras, particularly those of the so-called folding or collapsing variety, adapted to sustain the same without the use of a tripod during the making of time exposures, and it is the special object of the invention to so construct and arrange the parts that the support shall be connected to the lens and shutter supporting devices and move at all times with them, so that the line of support shall be at all times as nearly as possible directly under the shutter mechanism, thus securing greater stability in the apparatus during the operation of the shutter. Also another important advantage is that when not in use the support is folded behind some part of the shutter supporting structure, so that it is largely hidden from view and thus the appearance of the camera greatly improved and the support itself protected against injury by reason of contact with exterior objects.

In the drawings I illustrate the invention as applied to two forms of folding camera. These are examples only of many in which the invention may be embodied.

Figure 2:
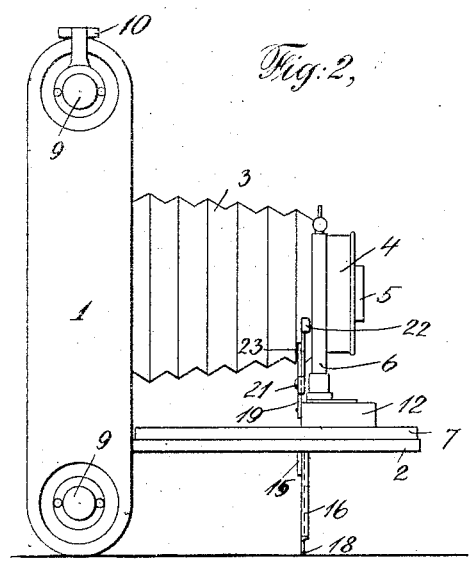
Figure 3:
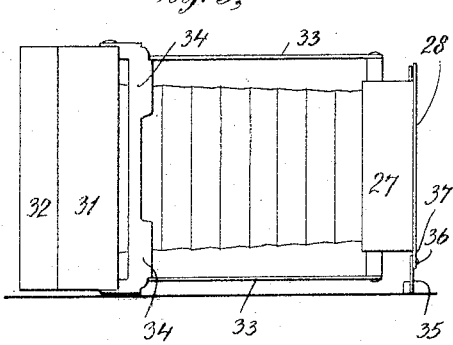
Figure 4:
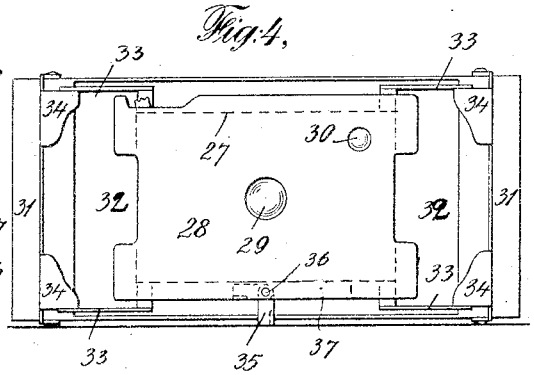

Figure 1 illustrates a front elevation of the invention as applied to an ordinary folding front camera, the front board being lowered and the lens frame projected; Fig. 2 illustrates a side elevation of that which is shown in Fig. 1; Fig. 3 illustrates a side elevation of the invention as applied to a small metal case camera of a different construction, the lens frame being projected; Fig. 4 illustrates a front elevation of that which is shown in Fig. 3.

Referring first to Figs. 1 and 2, 1 represents the camera body, 2 the folding front board, 3 the bellows, 4 the shutter casing, 5 the lens casing, 6 the shutter and lens supporting frame, 7 slideway rails for the supporting frame, 8 the finder, 9, 9, pin journals for the spools, and 10 the strap handle. All these parts are or may be of any preferred construction.

Two supports are shown in Figs. 1 and 2, one adapted to sustain the camera during vertical time exposures and the other adapted to sustain it during horizontal exposures. They are referred to herein respectively as the vertical and the horizontal supports. Referring first to the vertical support, 11 is a metallic arm secured to the rear side of a box 12 which forms part of the lens and shutter supporting frame 6 and which immediately engages with and slides upon the slideway rails 7. 13 is an angular piece of metal pivoted to the plate 11 at 14. It is provided with a flange 15 on its outer edge. 16 is what I call a leg member. It is pivoted to the part 13 by pivot 17. The end of this member is cut at an angle, as shown, and when the leg is fully extended, this angular end acts as a stop abutting against the flange 15 on the plate 13. The lower end 18 of the leg member is preferably made foot-like in shape, so as to afford a substantial bearing upon the surface upon which the camera rests. Referring now to the horizontal support, 19 is a plate likewise fastened to the rear side of the box 12 and to it is pivoted a device 20 which resembles a bellcrank lever. 21 is the pivot. The upper end of the device is provided with a small flange 22, whereby its area of contact with the supporting surface will be increased. 23 is a small indentation made on an upwardly extending part of the plate 19, with which a small projection 24 on the outwardly extending member of the support engages, when the parts are folded, thus securely holding the support in its then folded position. 25 is another projection likewise made on the support, which engages in the indentation 23 when the support is projected, in operative position, thus holding it therein.

The operation of the parts as thus far described is as follows: The vertical support is shown in the drawings by the full lines in its extended position. To fold it when not in use, the leg 16 is swung to the right, whereupon it pivots upon the pivot 17, assuming a position in line with the flange 15 on the plate 13. As soon as the leg engages with this flange, then the angled piece 13 itself turns upon the pivot 14 and both together are swung inwardly and upwardly into the vertical position, shown in dotted lines in Fig. 1, the upper end of the angled piece 13 resting against a flange 26 made upon the supporting plate 11 and the angled piece and the leg stand vertically behind the right hand edges of the shutter supporting frame 6. When in this position, it will be seen, the camera may be folded and the shutter and lens supporting frame moved inwardly or outwardly, the support being meantime almost entirely hidden from view by the supporting structure and protected by it from injury. Substantially the same operation attends the use of the horizontal support. It is shown in Fig. 1 in full lines in its folded or non-use position. To adapt it for use the upper part of the support is taken hold of and pulled out to the left, pivoting upon the pivot 21 in so doing. When it has attained the position shown in dotted lines in Fig. 1, then the projection 25 upon its inner member engages with the recess 23 made in the supporting plate 19 and the parts will thus be held in projected and camera supporting position. To fold the device, all that is necessary is to push it back again to its initial place behind and hence hidden from view by the shutter supporting structure.

In Figs. 3 and 4 I show the invention arranged and operating upon the same principle as in the other figures, but simplified in construction, since these Figs. 3 and 4 illustrate a small and relatively inexpensive form of camera. In them 27 represents the combined shutter and lens casing, 28 being the front plate thereof, 29 the lens, and 30 the finder. 31 is the camera body, 32 a removable back or cover for the camera body, 33 extendible arms which support the bellows and lens and shutter casings, and 34 the brackets which support the arms. All these parts are or may be of any preferred construction. The support 35 is pivoted at 36 to the downwardly extending portion 37 of the front plate 28 and when not in use is swung upwardly in the rear of that projecting edge, as shown in dotted lines in Fig. 4. Its projected and camera supporting position is shown in full lines in that figure. It will be noted that in this case, the same as in the others, the support is connected to and at all times moves with the lens and shutter supporting mechanism, so that it is at all times in substantially the same vertical plane as the shutter actuating mechanism and thus is best adapted to resist disturbances resulting from the operation thereof and also that when not in use it is folded behind the lower edge of the front plate 28, and is thus hidden from view and protected from injury.

It will be obvious to those who are familiar with this art that modifications other than those above described and illustrated may be made in the details of construction without departing from the essentials of the invention. I therefore do not limit myself to such details.

I claim:

1. In a camera, a swinging support pivoted to the inner side of the shutter supporting structure and moving with it.

2. In a camera, a swinging support pivoted to the inner side of the shutter supporting structure and adapted to fold behind and be hidden and protected by a part of the shutter supporting structure when not in use.

3. In a camera, a movable shutter casing adjustable toward and from the focal plane and a camera support pivoted to the inner side of said casing and moving therewith, whereby it is at all times in substantially the same vertical plane as the shutter mechanism and is adapted to fold behind and be hidden and protected by a part of the shutter mechanism when not in use.

4. In a camera, a movable shutter casing adjustable toward and from the focal plane and a camera support pivoted to and moving with said casing, whereby it is at all times in substantially the same vertical plane as the shutter mechanism and means to maintain the support in its projected or operative position.

5. In a camera, a support pivoted to the inner side of the shutter supporting structure and adapted to be swung outwardly into operative position and when not in use secreted behind and protected by the shutter supporting structure.

In testimony whereof I have signed my name to this specification in the presence of two subscribing witnesses.

CARL BORNMANN.

Witnesses:
  JNO. W. TOPLIFT,
  A. DEICHELMANN.

---

Copies of this patent may be obtained for five cents each, by addressing the "Commissioner of Patents, Washington, D. C."